United States Patent [19]
Klaubert et al.

[11] 3,852,996
[45] Dec. 10, 1974

[54] AUTOMOTIVE EXHAUST SYSTEM LEAK TEST

[75] Inventors: Earl C. Klaubert, Lexington; Adelbert L. Lavery, Natick; Anthony J. Broderick, Sudbury, all of Mass.

[73] Assignee: The United States of America as represented by the Secretary of the Department of Transportation, Washington, D.C.

[22] Filed: June 22, 1973

[21] Appl. No.: 372,749

[52] U.S. Cl. .............................. 73/40.5 R, 73/49.7
[51] Int. Cl. ............................................. G01m 3/28
[58] Field of Search.......... 73/40, 40.5 R, 49.1, 118, 73/119 R, 49.2, 46, 47, 49.7, 207, 205 R, 211, 213, 196; 116/117

[56] References Cited
UNITED STATES PATENTS
2,332,567  10/1943  Gardner ......................... 73/40.5 R
3,079,796  3/1963  Freudenthal et al. ................. 73/211
3,795,145  3/1974  Miller ................................. 73/213

Primary Examiner—Richard C. Queisser
Assistant Examiner—Marcus Rasco
Attorney, Agent, or Firm—Herbert E. Farmer; Harold P. Deeley, Jr.

[57] ABSTRACT

A method of quantitatively determining leaks in any constant mass input fluid flow system such as an automobile engine exhaust system, by measuring the pressure drops across a pair of different sized orifices interchangeably connected in a flowmeter, at the tailpipe exit of the exhaust system. The ratio of the pressure drops is derived and the measured values are calibrated with the specific orifice pair parameters to determine the effective size of a single round hole, which would leak an amount of exhaust equivalent to the total mass flow rate of leakage from all holes, of whatever size, shape, number and location, which may actually exist in a given exhaust system.

4 Claims, 5 Drawing Figures

TO PRESSURE GAUGE(S) 15

AUTOMOTIVE EXHAUST SYSTEM LEAK TEST

ORIGIN OF THE INVENTION

The invention described herein was made by employees of the United States Government and may be manufactured and used by or for the Government for governmental purposes without payment of any royalties thereon or therefor.

BACKGROUND OF THE INVENTION

1. Field of the Invention

The invention relates to a quantitative method and apparatus for determining leaks in a constant mass fluid flow system, and has particular utility in determining automotive vehicle leaks between the engine exhaust ports and the rear end of the exhaust system. The method of the invention can also be used to test for leaks in air brake hoses, couplings and in liquid and gas pipelines.

2. Description of the Prior Art

According to one type of prior art method of automotive exhaust system leak testing, the engine of the vehicle being tested is operated at its normal idle speed. The test operator obstructs the discharge of exhaust from the rear end of the exhaust system (referred to herein as the "tailpipe exit") by a rag or other convenient, non-standardized means; the degree of such obstruction is unquantized. This tailpipe exit obstruction serves both to increase the pressure within the exhaust system to some unknown degree, and also to reduce the level of exhaust noise discharging from the tailpipe exit. The test operator then listens to determine whether he can hear, and/or looks to try to see, exhaust discharging from any leaks between tailpipe exit and engine block. If the operator detects any such leak, generally he makes a subjective judgment as to whether such leak is "acceptable" or "excessive."

A variation of this prior art method comprises completely blocking the tailpipe exit. The criterion then is whether the engine continues to run, however erratically, or stalls completely. Any failure to stall results in rejection. However, if the engine stalls, regardless of what leaks may be evident, the exhaust system is accepted.

The first and most outstanding disadvantage of this type of prior art method is that it does not provide (1) an objective or quantitative assessment of the degree of stress imposed on any given exhaust system; (2) control or reproducibility between the stress imposed on one vehicle's system versus the stress imposed on preceding or subsequent vehicles in that same station; (3) control or reproducibility between the stresses imposed at one inspection station versus those imposed at other stations; and (4) objective, quantitative or reproducible assessment of the response of different exhaust systems to whatever degree of stress is imposed thereon. The evaluation of whether a given leak is "acceptable" or "rejectable" is completely subjective and susceptible to extremely widely-varying limits. Also, leaks at the forward portion of the system, presumably most dangerous to vehicle occupants, are farthest from the test operator and hence presumably less detactable.

With regard to the stall/no stall test, although the response criteria are reasonably objective, the length of time to operate with tailpipe obstructed may vary. More importantly, the rate at which the tailpipe obstruction reaches totality (and indeed, if totality is in fact achieved, since there is no proof of this) may vary, and a slow rate of obstruction can assist an engine with a leaky exhaust system to adjust successfully to increased backpressure, whereas more rapid obstruction would cause the engine to stall. Furthermore, a small engine with a fairly large exhaust system leak would continue to operate with tailpipe exit obstructed while a larger engine with the same size leak would stall. Finally, the absence of quantitative leak assessment in both techniques precludes intelligent analysis of the relative or absolute degree of hazard attributable to any given size of exhaust system leak, and therefore precludes development of even reasonably incontestable standards for acceptable or rejectable sizes of exhaust system leaks.

Quantitative leakage indicators are also known. Thus Kirkley U.S. Pat. No. 2,449,556 discloses a differential leakage indicator that may, for example, be used in a closed container such as an automotive engine cylinder wherein leakage is determined by measuring a differential pressure between two chambers separated by an orifice plate, the first chamber being under constant pressure. Mennesson U.S. Pat. No. 2,853,874 discloses an apparatus for measuring leaks in a closed chamber wherein fluid in a calibrated gauge flows toward a test chamber and away from a constant pressure course, at a rate which is indicative of leakage in the test chamber. Rondeau U.S. Pat. No. 3,028,750 discloses a leak tester utilizing a source of test pressure, which compares a simulated leak to a real leak.

SUMMARY OF THE INVENTION

The present invention relates to a method and apparatus for quantitatively detecting leaks in any constant mass input fluid flow system and particularly to an automobile exhaust system. The leak system may be used at any point in the constant flow system to determine leaks upstream. In the preferred embodiment an orifice type flowmeter and pressure gauge means are connected to the end of the tailpipe and a pair of different sized, readily interchangeable orifices are associated therewith. The ratio R of the pressure drops across the small and large orifices $\Delta pS/\Delta pL$ is determined. For each specific orifice pair, a calibration chart having appropriate ordinates such as ratio R and pressure drop $\Delta pL$ may be used to determine the size of a single round hole equivalent in effective area to the total of any leaks in the system (within the intended operating range of leak sizes of the test equipment). Depending upon the standards imposed for the exhaust system, the vehicle would then be either "passed" or "rejected." The following advantages result from the present invention:

(1) A quantitative evaluation of the combined effect of all leaks in an automotive exhaust system is obtained, which permits the description of such combined effect as being equivalent to the leakage from a single round hole of a specified size.

(2) The exhaust system being tested is subjected to known, reproducible levels of stress, thereby producing quantitatively comparable results between tests at different inspection stations. It also ensures application of a definable minimum stress level on all systems tested, and thereby affords a higher confidence level that systems which are passed will not become unduly hazardous before the next inspection period is reached.

(3) This test procedure can be performed quickly and does not require placing the vehicle on a lift, hence has relatively low operating cost.

(4) The test equipment is relatively low in cost.

(5) For exhaust system leaks exceeding ca. ⅛ in. effective single hole size, the discrimination between holes increasing in diameter by ⅛-inch increments is quite wide (up to at least ½ in. diameter); thus test results are relatively insensitive to operator technique and not subject to supportable arguments by owners of rejected vehicles. Furthermore, the wide discrimination afforded will permit the use of reasonable manufacturing tolerances to decrease production costs.

DETAILED DESCRIPTION OF THE INVENTION

Figure 1:
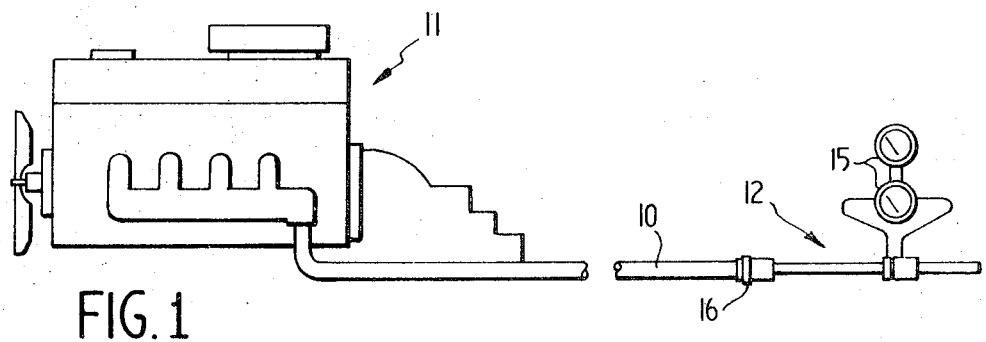
FIG. 1 is a schematic side elevation of an automobile exhaust system with the flowmeter and pressure gauge attached at the tailpipe exit.

FIG. 1 shows an apparatus according to the invention connected to an automobile or other vehicle exhaust system for leak testing thereof. The exhaust system terminates at tailpipe 10, through which exhaust gases from the engine 11 are normally exhausted. The exhaust system leak test comprises an orifice-type mass flowmeter 12, having a pair of different sized, readily interchangeable orifices 13 and 14. It further comprises one, or more if necessary, pressure gauges 15 of appropriate sensitivity to measure the pressure drop across orifices 13 and 14 caused by exhaust flow therethrough. The flowmeter 12 is connected to the tailpipe exit of the exhaust system by a suitable leak-tight clamp or adapter 16. The clamp or adapter 16 may either be directly attached to the tailpipe, or may be joined thereto by an intermediate unspecified length of suitable hose or tubing. A number of pairs of different sized orifices, all interchangeable in the same flowmeter body, provide coverage of overlapping ranges of mass flow to accommodate the entire volumetric displacement range of engines to be measured and to allow for variations in idle speed, carburetion, etc., of otherwise similar sized engines.

Figure 3:
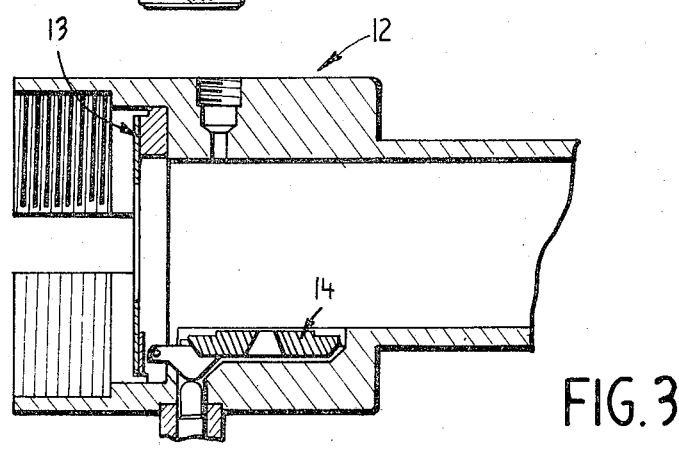
FIG. 3 is a schematic elevation view of the flowmeter with the larger of the pair of orifices inserted therein.

During a test, flowmeter 12 is attached to the tailpipe exit of the exhaust system by clamp 16, with the larger orifice 13 of the pair of orifices in place so as to cause all exhaust gases leaving the tailpipe to pass through orifice 13, as shown in FIG. 3. The auto's engine is allowed to operate at normal idle, and it is assumed the engine will have been reasonably warmed up before initiating the leak test. Flow of exhaust through orifice 13 generates a pressure drop thereacross within a prescribed low range, e.g., between 0.01 and 0.30 lb/sq. in. (psi). The specific pressure range, and ratio of pressure drops between large and small orifices 13 and 14 of the pair of orifices, are to some degree a matter of choice, desired test sensitivity and system cost. Within the low pressure drop range, which is very nearly equal to backpressure developed throughout the exhaust system by restriction caused by orifice 13, some small fraction of the total mass flow of exhaust discharged by the engine will escape from any leaks in the exhaust system and thereby avoid passing through orifice 13. The pressure drop across orifice 13, then, will be a small but unknown amount less than would have been observed had the exhaust system had no leaks. Any uncertainty of the decrement due to leakage, and even ignorance that such a decrement exists, in the pressure drop across orifice 13 are not detrimental to the test according to the invention, and the pressure drop observed across the orifice 13 will merely be recorded.

Figure 2:
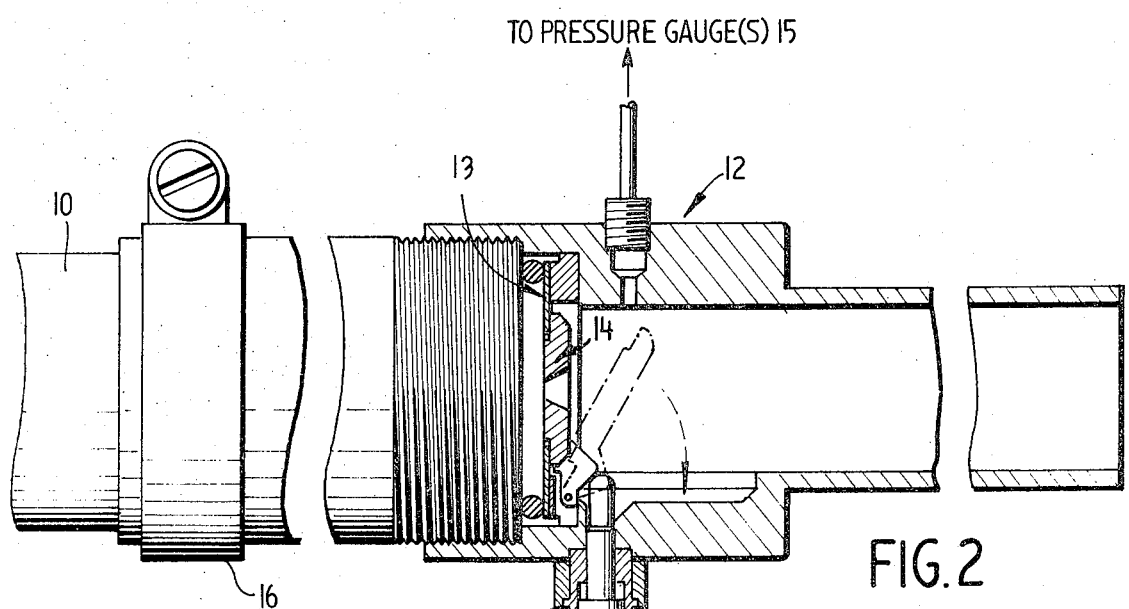
FIG. 2 is a schematic elevation view of the flowmeter with the smaller of the pair of orifices inserted therein.

After recording the pressure drop across the larger orifice 13, the operator quickly (in a few seconds) installs the smaller orifice 14 of the pair in flowmeter 12 so that the smaller orifice 14 replaces the larger one 13 as the restriction to exhaust flow from the tailpipe, as shown in FIG. 2. As soon as the pressure drop across the smaller orifice 14 reaches its maximum stable value, within 5 to 10 seconds of small orifice insertion, the operator reads the pressure drop thereacross and releases or removes the small orifice from the exhaust stream, then records the observed small orifice pressure drop. To enhance the accuracy and demonstrate the repeatability of the complete test, the operator may take two or three pairs of pressure drop measurements at intervals of perhaps 20 to 30 seconds. It is important, as explained below, that imposition of the small orifice and observation of the peak pressure drop thereacross be accomplished quickly, within a total elapsed time of about 10 to 15 seconds. Operation with an observation of pressure drop across the larger orifice 13 is not critical and may be performed at relative leisure, consistent with time allotted for exhaust system leak testing.

The smaller orifice 14 will have been sized with respect to the larger orifice 13 of the pair so that when the larger orifice develops its maximum recommended pressure drop, the smaller orifice similarly will develop some specified maximum pressure drop, if mass flow rate, composition and temperature of exhaust remain constant. For illustrative purposes, although this invention is not limited to these values, assume the large orifice is sized to develop a pressure drop ($\Delta pL$) of 0.250 psi at its intended maximum flow rate, and the smaller orifice is sized to develop a pressure drop ($\Delta pS$) of 5.00 psi at the identical flow conditions. Further assume that these pressure drops will be developed on the vehicle under test if there are no leaks in the exhaust system. Now, if there is a leak (or a multiplicity of leaks) in the exhaust system, $\Delta pL$ will be somewhat less than 0.250 psi. However, the operator would not necessarily know that such leaks exist, or that the zero leak $\Delta pL$ should have been 0.250 psi. He merely observes that $\Delta pL$ equals, for example, 0.140 psi, which is within the range prescribed for this large orifice. Similarly, with respect to the small orifice, assume the operator records a pressure drop $\Delta p S$ of 1.33 psi.

Figure 4:
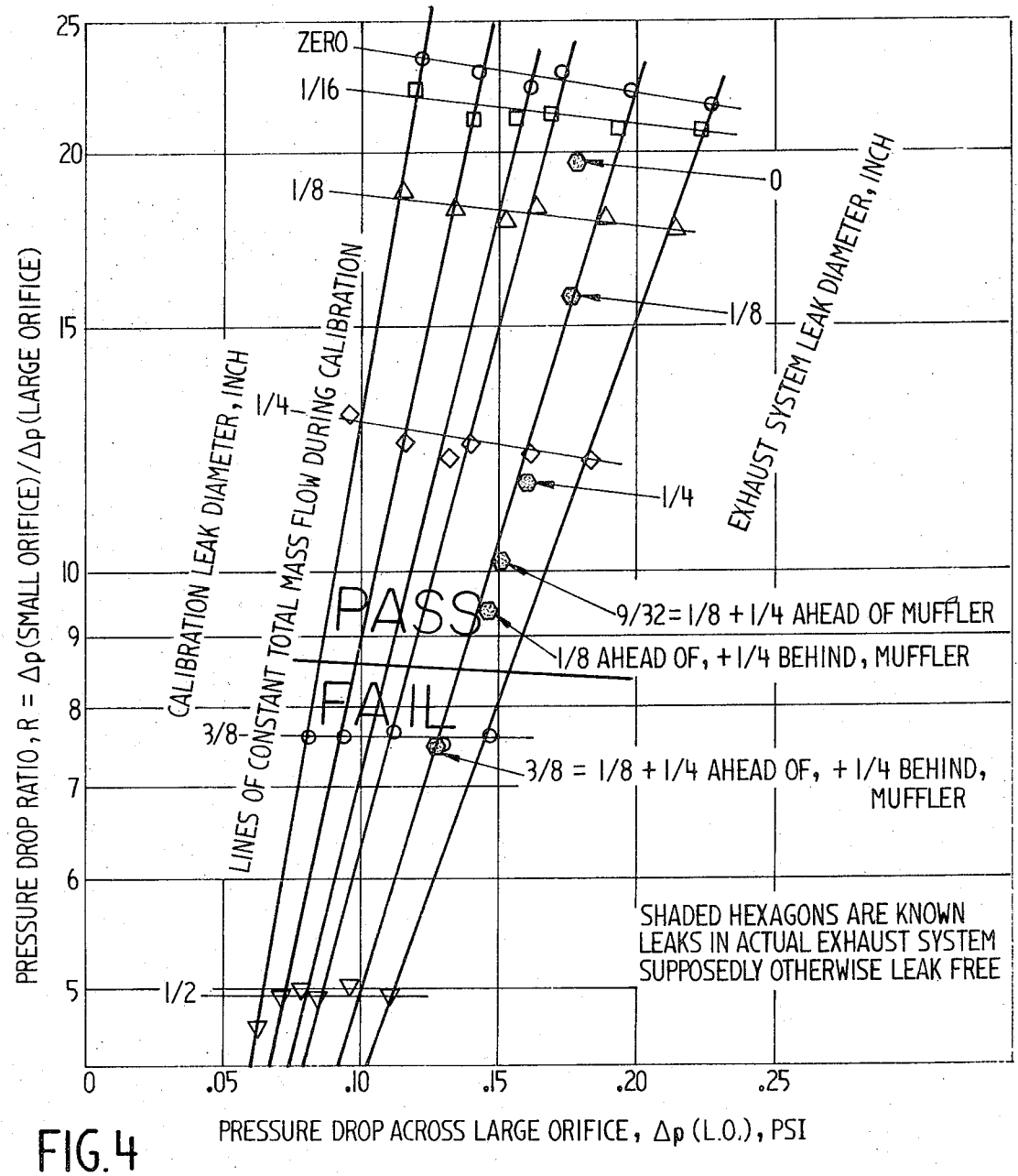
FIG. 4 is a calibration chart that may be used in practicing the method of the invention.

The significant quantity is the ratio $R = \Delta pS/\Delta pL$, which is determined by calculation or from a nomograph. In the example, $R = \Delta pS/\Delta pL = 9.5$. A calibration chart (FIG. 4) for each specific orifice pair may be provided to determine whether or not a particular system meets certain set standards. The calibration chart has a vertical ordinate showing the ratio $R = \Delta pS/\Delta pL$ for values between, for example, 20.0 and 1.0, which may be on a logarithmic scale, and a horizontal abscissa showing values of ΔpL between, for example, 0.05 and 0.250 psi, which may be on a linear scale. The chart includes a region marked "PASS," which is bounded at the top by the curve corresponding to the measured values of R for zero leakage at flow conditions producing the given range of ΔpL, and at the bottom by the measured values of R for some specified maximum single leak diameter over the same range of flow conditions. The area below the "PASS" region is marked "FAIL." The boundary between the "PASS" and "FAIL" regions shown on FIG. 4 at approximately 0.35 in. calibration leak diameter is for illustrative purposes only as an example of a specific boundary which would be defined in any legislative standard requiring this test. The operator locates the value of ΔpL observed in this test (0.140 psi in the example above) and follows that value vertically upward to the ratio R (R = 9.5 is the calculated ratio observed in this test according to the example). This ratio might correspond to a leak equivalent in total area to a single round hole ranging from about 3/16 in. to ⅜ in., depending on the sizes of the orifice pair, although the equivalent hole size might not be shown on the chart (conceivably, the hole size corresponding to the lower limit of the "PASS" region might be specified). If the point corresponding to ΔpL = 0.140 psi and R = 9.5 fell within the "PASS" region, the vehicle's exhaust system would be considered acceptable; although leaking, its leakage rate would be considered not to be hazardous. However, if that point fell in the "FAIL" region, the vehicle's exhaust system would not pass inspection because its leakage rate would be defined by the standards as potentially hazardous, and repair would be required in order to pass inspection.

The functioning of this test is dependent upon the fact that automotive engines at idle with constant throttle setting act in general as constant-mass-rate pumps independent of exhaust backpressure over the range of 0 to 5 psig (psi gauge, i.e., with respect to ambient barometric pressure). As back-pressure varies from 0 to about 5 psig, engine speed may decrease by 20 to 30 per cent of zero-backpressure value, but air throughput decreases by varying amounts from 0.5 to perhaps 3 per cent. Thus the mass flow rate from the tailpipe exit will be essentially constant independent of orifice size, if there are no leaks in the exhaust system, and the ratio R can be quite accurately predicted for a given ΔpL (for orifice pairs which have been physically flow-calibrated).

However, if there are leaks in the system, some small fraction of the total, constant exhaust mass flow will escape from the leaks at the small backpressure generated by the large orifice, and ΔpL will be lower than that which would have been observed if there were no leaks in the system. The measurement of ΔpL serves to provide a calibration baseline of the actual mass flow rate leaving the tailpipe exit at the low backpressure imposed by the large orifice. When the backpressure on the exhaust system is increased to a substantial multiple of ΔpL by the impostion of the smaller orifice, the mass loss from the exhaust system leaks increases, to a first approximation, by the square root of the increase in system gauge pressure (i.e., approximately as $\sqrt{R}$). Thus less exhaust must pass through the smaller orifice than did through the larger, and R therefore is lower than would be observed at equal mass flow through both orifices.

The ratio, R = ΔpS/ΔpL, is quite sensitive to relatively small leak sizes. A typical orifice pair sized for intermediate-class passenger cars has produced the following approximate values of R for single-hole system leaks of the sizes shown:

| Leak Diameter, in. | 0 | 1/16 | ⅛ | ¼ | ⅜ | ½ |
|---|---|---|---|---|---|---|
| R=ΔpS/ΔpL | 23.5 | 21.7 | 18.0 | 11.0 | 6.5 | 4.05 |

Yet the value of R corresponding to a given size of leak, for a given orifice pair, varies only slightly with flow rate (or ΔpL), especially as leak diameter increases above ca. ¼ in. (see lines of constant leak size in FIG. 4). This facilitates interpretation of the calibration charts to be used in exhaust system leak testing, and minimizes the precision required of the test operator in reading and plotting the test data for a given vehicle.

It was noted heretofore that insertion of the small orifice and reading of maximum ΔpS resulting therefrom should be accomplished as quickly as possible so as not to disturb the accuracy of the ΔpS reading. The reason for this is that the exhaust gases lose considerable amounts of heat in passing along the exhaust system of a vehicle at engine idle, and may decrease in temperature by well over 100°C. Further, the amount of heat loss has been shown to be significantly affected by the backpressure created by the flowmeter; increased backpressure results in increased cooling of the gas. A sudden increase in backpressure from ca. 0.5 to 5.0 psig has been found, for one vehicle, to cause tailpipe exhaust gas temperature to decrease repeatably from ca. 135°C. to ca. 50°C. in 1 minute. This phenomenon is quite variable from one vehicle to another and with ambient conditions. The importance of this phenomenon to this invention lies in the fact that pressure drop across an orifice theoretically is directly dependent upon the absolute temperature of the gas, all other factors being constant. Thus the temperature change cited immediately above, from 408°K. to 323°K., would produce a decrease in pressure drop of ca. 21 per cent. Therefore it is important that pressure and peak pressure observations be accomplished as quickly as possible to minimize distortion of test results by variable cooling effects. However, in fluid flow systems in which fluid temperature changes do not occur as a consequence of varying backpressure, the time in which the ΔpS reading is taken is not critical.

Figure 5:
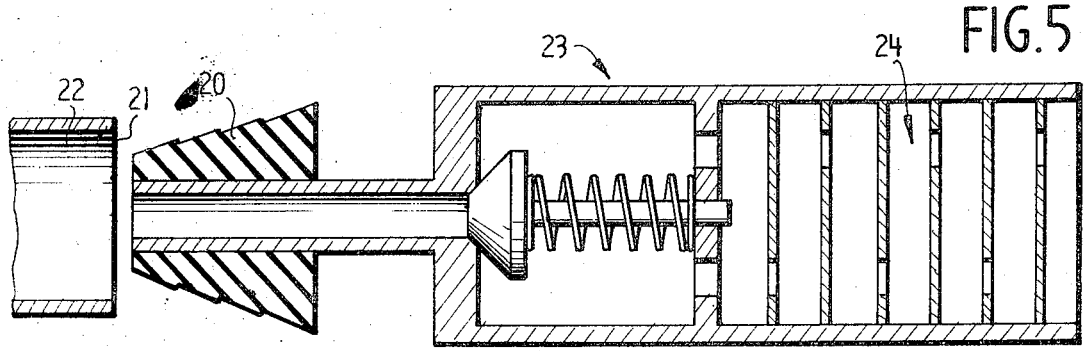
FIG. 5 is a schematic view of an automobile exhaust system with a plug and relief valve at the tailpipe exit.

FIG. 5 illustrates an alternate embodiment to provide a qualitative method of determining leaks in an automobile exhaust system. The marked increase in noise level over that of a zero-leak system from even a ¼-in. diameter hole located ahead of the muffler, when exhaust system backpressure at engine idle is raised to 4 to 5 psig, suggests that an adequate evaluation of exhaust system condition may be performed without quantitative measurements. This provides a more economical test than the preferred embodiment. The operator's ear perhaps can be an adequate detector of really serious leaks. However, in such a case, it is very desirable to minimize the variability in stress (i.e., backpressure) imposed on the exhaust system under test. This is accomplished in the following manner.

A tapered soft rubber plug 20 (or other suitable means) is used to completely seal the exit 21 of the exhaust pipe 22. This plug allows passage of exhaust gases to a simple relief valve 23 that produces a backpressure reasonably reproducible and independent of exhaust flow rate—e.g., within limits of 4.0 to 5.0 psig. The gas discharged from relief valve 23 is then vented to the atmosphere through a silencer 24 which reduces to as low a level as practicable all noises associated with exhaust discharge. There is no pressure measurement device provided.

Such an exhaust leak test device is considerably cheaper in cost and in use, and requires less operator training, than the dual-orifice flowmeter described earlier. This simplified leak test device offers two significant improvements over present exhaust system leak test procedures. It imposes known and reproducible stress conditions on all vehicles tested, independent of operator or inspection station; and it affords a high and reproducible degree of exhaust noise attentuation so that the operator is better able to hear the sounds of any significant exhaust leaks.

It is to be understood that various substitutions and modifications can be made without departing from the spirit and scope of the invention as defined in the claims. For example, the larger orifice can be a permanent part of the system with the smaller orifice being inserted in series with the larger orifice. And the chart used to determine test results could be, inter alia, a table of numbers or a special purpose slide rule. The invention also can be embodied without the use of any orifices, e.g., by using two different mass flowmeters of substantially equal flow range but which produce significantly different pressure drops, such as two rotameters (variable area flowmeters) of different diameter and appropriately different "float" weights. The lower $\Delta p$ flowmeter would correspond to the larger orifice and the higher $\Delta p$ flowmeter to the smaller orifice. Then only one pressure gauge to measure system backpressure upstream of the flowmeters is required. Alternatively, flowmeters with electronic readouts could be employed, along with other required electronic subsystems, in such a fashion as to considerably reduce or even eliminate the need for reference to tables and graphs, substituting instead various well-known means of electronic signal processing. Also, it is to be recognized that a single orifice of adjustable diameter could be employed in place of any of the foregoing means for varying the system backpressure.

We claim:

1. In a constant mass input fluid flow system, a method of quantitatively determining leaks in the system with a pair of different sized orifices interchangeably connectible in a flowmeter at the output of the flow system, comprising the steps of:
    measuring the pressure drop $\Delta pL$ across the larger sized orifice connected in the flowmeter,
    interchanging the smaller sized orifice with the larger sized orifice and measuring the pressure drop $\Delta pS$ across the smaller sized orifice connected in the flowmeter,
    deriving the ratio R of the pressure drops across the larger and smaller sized orifices, $R = \Delta pS / \Delta pL$, and
    determining from the ratio R and the pressure drop $\Delta pL$ across the larger sized orifice the effective total leakage area of the system.

2. The method of claim 1 further comprising the step of measuring the pressure drop $\Delta pS$ across the smaller sized orifice within a sufficiently short time after inserting the smaller sized orifice as the flow restriction to obviate significant changes in fluid temperature.

3. In a gas exhaust system for an automobile engine, a method of quantitatively determining leaks in the system with a pair of different sized orifices interchangeably connectible in a flowmeter at the output of the exhaust system, comprising the steps of:
    running the engine at a constant throttle setting;
    measuring the pressure drop $\Delta pL$ across the larger sized orifice connected in the flowmeter,
    interchanging the smaller sized orifice with the larger sized orifice and measuring the pressure drop $\Delta pS$ across the smaller sized orifice connected in the flowmeter,
    deriving the ratio R of the pressure drops across the larger and smaller sized orifices, $R = \Delta pS / \Delta pL$, and
    determining from the ratio R and the pressure drop $\Delta pL$ across the larger sized orifice the effective total leakage area of the system.

4. The method of claim 3 further comprising the step of measuring the pressure drop $\Delta pS$ across the smaller sized orifice within a sufficiently short time after inserting the smaller sized orifice as the flow restriction to obviate siginificant changes in fluid temperature.

\* \* \* \* \*